Nov. 22, 1949         B. F. CONNER ET AL         2,488,850
                          COMPACT
                     Filed June 28, 1946
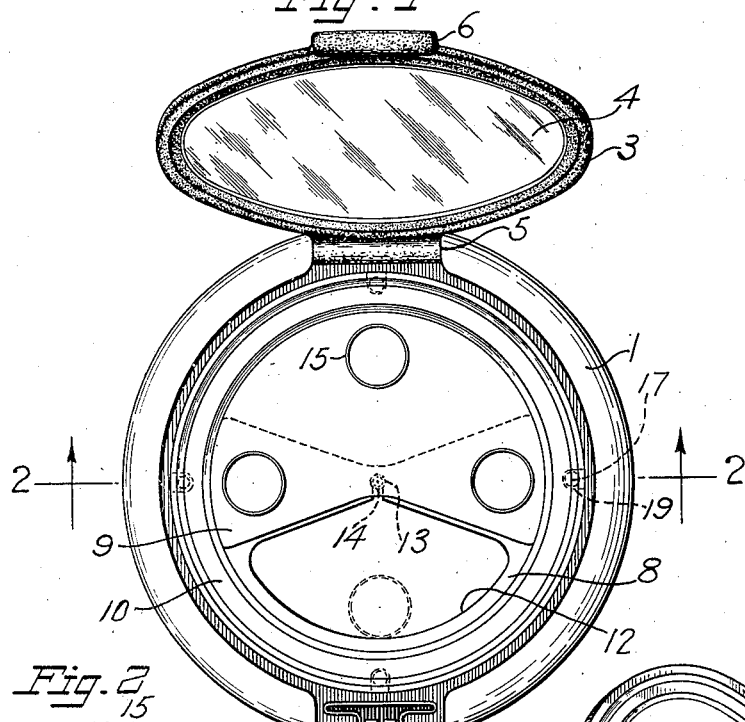
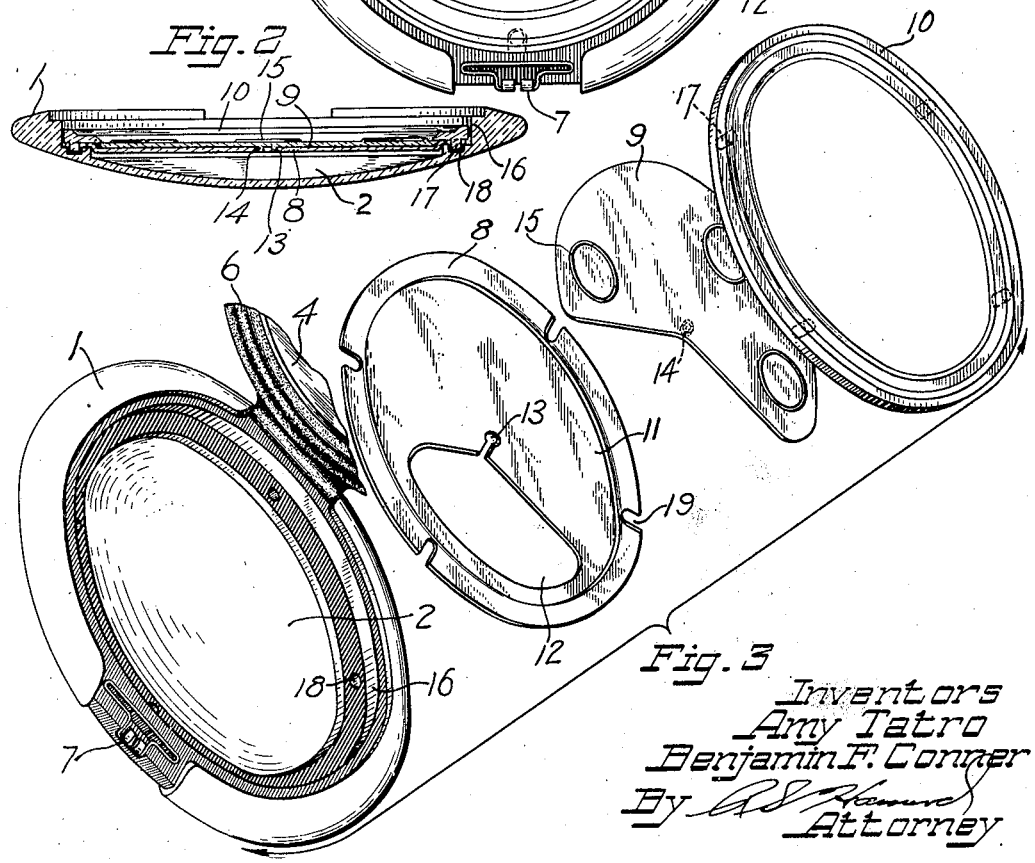
Inventors
Amy Tatro
Benjamin F. Conner
By
     Attorney Patented Nov. 22, 1949

2,488,850

UNITED STATES PATENT OFFICE 2,488,850

COMPACT

Benjamin F. Conner, West Hartford, and Amy Tatro, Hartford, Conn., assignors to Colt's Manufacturing Company, a corporation of Connecticut Application June 28, 1946, Serial No. 680,050

2 Claims. (Cl. 132—82)

The invention relates to compacts and more particularly to compacts of the type adapted to contain loose face powder. Compacts of this type present special problems due to the necessity for preventing the loose powder from sifting out.

The primary object is to provide a compact adapted to contain loose powder and having a powder seal which effectively prevents spilling and sifting of the loose powder from the compact.

Another object of the invention is to provide a compact having a powder seal of the character just mentioned which is relatively simple in construction and inexpensive to manufacture.

From the description which follows further objects and advantages of the invention will be apparent to those skilled in the art.

In the drawing:

Fig. 1 is a top plan view of a compact embodying the invention, the cover being shown in open position.

Fig. 2 is a cross sectional elevational view of the compact taken on the line 2—2 in Fig. 1.

Fig. 3 is an exploded view of the compact shown in Fig. 1.

As will be apparent from the several figures of the drawing, the compact comprises a main body 1 having a recess 2 therein adapted to receive loose powder. Hinged to the body is a suitable cover 3 preferably provided with a mirror 4 secured thereto. The cover is hinged in any desired manner to the body as at 5 and is provided with a projection 6 adapted to engage a spring latch 7 when in closed position for preventing unintentional opening of the cover.

For preventing spilling or sifting of the loose powder contained in the recess 2, a powder seal is provided comprising the members 8, 9 and 10. Referring more particularly to Figs. 2 and 3, it will be seen that the member 8 constitutes a primary sealing member which substantially closes the recess 2. The member 8 is circularly recessed as shown at 11 and has an opening 12 therethrough affording access to powder contained in the recess 2 of the body. At the center of the circular recess 11 a small recess 13 is provided for reasons which will be apparent hereinafter.

In accordance with the presently preferred embodiment of the invention, the member 9 constitutes a secondary sealing member and is arcuate in shape and of a size to be received within the circular recess 11 in the primary sealing member. The secondary seal is provided on its underside with a projection 14 receivable in the recess 13 in the primary seal to pivotally and rotatably associate the two sealing members. For reasons which will be later apparent, the member 9 is preferably made slightly less in thickness than the depth of the recess 11 and is provided with one or more projections 15.

The primary and secondary sealing members may be held in their assembled relationship in any desired manner, but in the now preferred construction a securing ring 10 is provided for this purpose. The ring is so dimensioned as to be receivable in a recess 16 in the body 1 and, when so positioned, to overlie the edges of both the primary and secondary sealing members as is readily apparent in Fig. 2. Means of any type may be provided for fastening the securing ring 10 in the body 1, but preferably one or more projections 17 are provided on the underside of the ring which are cemented or otherwise suitably secured in complementary recesses 18 in the body 1, the primary sealing member being notched at 19 to allow the projection 17 to pass through the primary seal.

While a compact embodying the principles of the invention may be made from any desired material, the construction is such as to particularly adapt itself to the use of molded plastic material such as, for example, urea formaldehyde, polystyrene and methyl methacrylate.

When in use, the recess 2 which is adapted to receive the loose powder may be readily filled by positioning the secondary member 9 as shown in solid lines in Fig. 1, the projections 15 serving as friction points for the finger tip for rotating the secondary sealing member to allow free access to the opening 12 in the primary sealing member. When filled, the powder may be sealed in the recess 2 by merely rotating the secondary sealing member 9 to the position shown in dotted lines in Fig. 1, in which position the secondary seal serves to close the opening 12. As pointed out above, the secondary sealing member 9 is slightly thinner than the depth of the recess 11 to allow its relatively free rotation from sealing to non-sealing positions. As shown in Fig. 2, the recess 16 in the body 1 is preferably sufficiently deep to permit a powder puff (not shown) to be placed in the compact above the powder seal.

From the foregoing it will be apparent that a compact embodying the principles of the invention will be relatively inexpensive to manufacture, particularly when made from molded plastic material, and yet the construction is such as to provide an effective seal against sifting of powder when the compact is being carried.

While the now preferred embodiment has been illustrated and described, equivalent constructions within the scope of the appended claims will be readily apparent to those skilled in the art to which it pertains.

What we claim is:

1. In a compact the combination of a body having a recess therein for holding powder and a powder seal for preventing powder from sifting out of said recess, said powder seal comprising a notched primary sealing member substantially closing the recess and having a depression therein, a secondary sealing member rotatably carried by the primary sealing member and positioned within the depression therein for movement to and from positions preventing and permitting access through the primary sealing member to powder held in the said recess, ring-like means overlying the outer edges of the said members for securing them in said body, and a pin extending between the said body and ring-like means and received in the notch in the primary sealing member, the said pin serving to definitely position the primary sealing member with respect to the body.

2. In a compact the combination of a body having a recess therein for holding powder and a powder seal for preventing powder from sifting out of said recess, said powder seal comprising a notched primary sealing member overlying the said recess and having an opening therethrough of substantial size to permit access to powder in the said recess and also having a circular depression therein, an arcuate secondary sealing member rotatably carried by the primary sealing member and positioned within the depression therein for movement to and from positions preventing and permitting access to the opening through the primary sealing member, ring-like means overlying the outer edges of said members for securing them in said body, and a plurality of pins extending between the said body and ring-like means and received in the notches in the primary sealing member, the said pins serving to definitely position the opening through the primary sealing member with respect to the body.

BENJAMIN F. CONNER.
AMY TATRO.

REFERENCES CITED

The following references are of record in the file of this patent:

UNITED STATES PATENTS

| Number | Name | Date |
|---|---|---|
| 1,572,850 | Slaiger | Feb. 9, 1926 |
| 1,667,486 | Morrison | Apr. 24, 1928 |
| 1,672,649 | Lester | June 5, 1928 |

FOREIGN PATENTS

| Number | Country | Date |
|---|---|---|
| 517,884 | Great Britain | Feb. 12, 1940 |